(12) United States Patent
Brooks

(10) Patent No.: US 11,204,064 B2
(45) Date of Patent: Dec. 21, 2021

(54) ADJUSTABLE BEARING ASSEMBLY

(71) Applicant: Accuride International Limited, Northampton (GB)

(72) Inventor: David Michael Brooks, Northampton (GB)

(73) Assignee: Accuride International Limited, Northampton (GB)

( * ) Notice: Subject to any disclaimer, the term of this patent is extended or adjusted under 35 U.S.C. 154(b) by 70 days.

(21) Appl. No.: 16/496,067

(22) PCT Filed: Mar. 22, 2018

(86) PCT No.: PCT/GB2018/050748
§ 371 (c)(1),
(2) Date: Sep. 20, 2019

(87) PCT Pub. No.: WO2018/172777
PCT Pub. Date: Sep. 27, 2018

(65) Prior Publication Data
US 2021/0115970 A1    Apr. 22, 2021

(30) Foreign Application Priority Data
Mar. 22, 2017  (GB) .................................. 1704500

(51) Int. Cl.
*F16C 29/02* (2006.01)
*F16C 29/00* (2006.01)

(52) U.S. Cl.
CPC ............ *F16C 29/001* (2013.01); *F16C 29/02* (2013.01)

(58) Field of Classification Search
CPC ...... F16C 29/001; F16C 29/02; F16C 29/123; F16C 29/126
See application file for complete search history.

(56) References Cited

U.S. PATENT DOCUMENTS 6,880,974 B2 * 4/2005 Moshammer ........... F16C 29/02
384/39

FOREIGN PATENT DOCUMENTS

DE      19920477 A1    11/2000
DE   102006044527 A1     4/2008
(Continued)

OTHER PUBLICATIONS

International Search Report and Written Opinion of PCT/GB2018/050748 of the International Searching Authority completed Jun. 18, 2018 (16 pages).
(Continued)

*Primary Examiner* — Phillip A Johnson
(74) *Attorney, Agent, or Firm* — Brian B. Shaw, Esq.; Harter Secrest & Emery LLP

(57) ABSTRACT

The present invention provides an adjustable bearing assembly comprising a first bar and a second bar. The first bar comprises a first engagement surface which is configured to engage with a second engagement surface on the second bar. The first bar further comprises a bearing surface opposite the first engagement surface. One of the first or second engagement surfaces comprises a first plurality of teeth aligned in a first direction, wherein the plurality of teeth are configured to engage a plurality of inclined surfaces on the other of the first or second engagement surfaces such that a force applied to the second bar in the first direction causes the distance between the bearing surface and the second bar to vary.

16 Claims, 7 Drawing Sheets

(56) References Cited

FOREIGN PATENT DOCUMENTS

| FR | 913547 A | 9/1946 | |
|----|----------|--------|---|
| WO | 2016089857 A1 | 6/2006 | |
| WO | WO-2013156287 A1 * | 10/2013 | .............. F16C 29/02 |

OTHER PUBLICATIONS

Chinese National Intellectual Property Office (CNIPA), Office Action in CN Application No. 201880020308.9 dated Apr. 29, 2020.
United Kingdom Intellectual Property Office, Search and Examination Report in UK Application No. GB1704500.6 dated Aug. 23, 2017.
United Kingdom Intellectual Property Office, Examination Report under Section 18(3) in UK Application No. GB1704500.6 dated Oct. 24, 2019.

* cited by examiner

ADJUSTABLE BEARING ASSEMBLY

FIELD OF THE INVENTION

The present invention relates to slides which allow for relative linear motion between two bodies.

BACKGROUND OF THE INVENTION

Friction slides, or linear plain bearings as they are sometimes known, are used to permit linear motion between two or more components. They may be implemented in a variety of potential geometries including one in which a slide member linearly slides along an elongated rail.

Many traditional machine tools (lathes, milling machines, etc.) have slide-ways that are based on basic friction slide designs. Basic friction slides generally comprise a sliding member having wear resistant low friction plastic strips that act as bearings surfaces. Generally the sliding member slides on elongate aluminium or steel rails. Friction slides generally do not require lubrication and are particularly suitable for working in dirty environments.

More complex friction slides designs have the additional feature of adjustability. In these designs the plastic strips can be moved to reduce the working distance or alter the force between the plastic strips and the elongate rail. Such adjustable friction slides generally require end users to readjust, or tweak, the bearing surfaces to optimize the sliding operation. On known designs, this readjustment is difficult and requires a lot of skill and time. Automatically adjusting friction slides have been previously described in US2002/0181809A1. However, the known designs require enlarged sliding members and are limited in their ability to respond to certain conditions in particular to varying loads.

It would therefore be preferable to develop an improved adjustable friction slide that is more easily adjusted without the drawbacks that are associated with known designs.

SUMMARY OF THE INVENTION

The present invention is defined by the independent claims with further optional features being specified by the dependent claims.

According to a first aspect of the invention, there is provided an adjustable bearing assembly comprising a first bar and a second bar. The first bar comprises a first engagement surface which is configured to engage with a second engagement surface on the second bar. The first bar comprises a bearing surface opposite the first engagement surface. One of the first or second engagement surfaces comprises a first plurality of teeth aligned in a first direction. The plurality of teeth are configured to engage a plurality of inclined surfaces on the other of the first or second engagement surfaces such that a force applied to the second bar in the first direction causes the distance between the bearing surface and the second bar to vary.

Preferably the first engagement surface comprises the first plurality of teeth and the second engagement surface comprises a second plurality of teeth. The first plurality of teeth and the second plurality of teeth are in meshed engagement.

The force that is applied to the second bar may result in a change in the position of the second bar along the first direction relative to the first bar. The first direction is preferably parallel with a plane defined by the bearing surface.

The first plurality of teeth may comprise a plurality of similarly sized teeth. Each tooth of the first plurality of teeth may have an inclined surface, the inclined surface being inclined relative to the first direction.

In some embodiments, the inclined surface is inclined from the first direction by an angle in the range 130 to 160 degrees, preferably in the range 140 to 150 degrees, or more preferably an angle of 145 degrees.

In some embodiments, the first plurality of teeth have a first truncated saw tooth profile, and the second plurality of teeth have a second truncated saw tooth profile.

Preferably, the second plurality of teeth have a complementary profile to the profile of the first plurality of teeth.

Preferably, the bearing surface has grooves or ridges extending in the first direction. The bearing surface may have filleted or radiused edges.

Relative movement of the first bar relative to the second bar in the first direction may cause relative movement of the first bar relative to the second bar in a second direction, wherein the second direction is orthogonal to the first direction.

In some embodiments, the first bar has a step in the bearing surface.

Preferably, the second bar is recessed to receive and partially surround the first bar.

According to an aspect of the invention, there is provided a sliding member comprising an above-detailed adjustable bearing assembly.

Generally, the sliding member comprises a body member. The sliding member further may comprise a first end cap and a second end cap located at opposing ends of the body member.

Preferably, the first bar comprises a locating tab to engage the first end cap or the second end cap. The locating tab may be received in a slot in the first end cap or in the second end cap.

At least one of the first end cap and the second end cap may have a plurality of apertures to enable communication with the interior of body member.

Preferably, both the first end cap and the second end cap comprise attaching means so that the first end cap and the second end cap attach together when pressed together in the longitudinal direction.

The attaching means may comprise a plurality of longitudinal projections, the plurality of projections comprising an aperture and a resilient deflectable protrusion designed to be received in the aperture.

Preferably, the attaching means may have longitudinal grooves to align the first end cap and the second end cap as they are pressed together.

In some embodiments, the adjustable bearing assembly comprises a closing adjuster configured to close the adjustable bearing assembly.

The closing adjuster may be configured to apply a closing force to either the first bar or the second bar. The closing force may be dependent on the position of the second bar relative to the first bar. The closing adjuster may comprise a resilient element that may comprise a spring and, preferably, a rod which extends through the spring.

The closing adjuster may be partially received in a receptacle in the second bar. Preferably, the closing adjuster is in contact with the second end cap.

In some embodiments, the adjustable bearing assembly comprises a manual opening adjuster configured to open the adjustable bearing assembly. The manual opening adjuster may be configured to apply an opening force to either the first bar or the second bar.

Preferably, the manual opening adjuster extends through the first end cap, wherein the manual opening adjuster is configured to allow manual changing of the opening force and/or the position of the second bar relative to the first bar.

The manual opening adjuster may be in threaded engagement with the first end cap. The manual adjuster preferably extends through the first end cap.

The manual opening adjuster may be partially received in a receptacle in either the first or the second bar.

In some embodiments, the adjustable bearing assembly comprises an automatic opening adjuster configured to automatically open the adjustable bearing assembly. The automatic opening adjuster may apply an automatic opening force to either the first or the second bar.

The automatic opening force may be dependent on the position of the second bar relative to the first bar.

Preferably, the automatic opening adjuster comprises a resilient element, such as a spring. A rod may extend through the spring.

The automatic opening adjuster may be configured so that the automatic opening force applied by the adjuster can be manually changed.

The adjustable bearing assembly may be configured to accommodate the opening adjuster at least partially within the first bar and the second bar.

The sliding member of the present invention may comprise a web, a first flange and a second flange which together define a channel. The adjustable bearing assembly may be located within the channel and, optionally, configured such that the bearing surface adjustably protrudes into the channel.

In one particular configuration, the adjustable bearing assembly is a first adjustable bearing assembly, the sliding member further comprises a second adjustable bearing assembly, the first adjustable bearing assembly is located on the first flange, and the second adjustable bearing assembly is located on the second flange.

Preferably, the sliding member further comprises a third adjustable bearing assembly as described above, the third adjustable bearing assembly being located on the web. The second bar of the third adjustable bearing assembly may comprise a groove in a surface opposite the second plurality of teeth. Preferably, the second bar of the third adjustable bearing assembly comprise tabs protruding partially over the groove.

The sliding member, as described above, may have the second bar of the first adjustable bearing assembly and/or the second bar of the second adjustable bearing assembly configured to limit lateral movement of at least part of the third adjustable bearing assembly.

The present invention also relates to a sliding assembly that may comprise the sliding member as described above, and an elongate rail, wherein the sliding member is configured to slide on the elongate rail.

Preferably, the elongate rail has a T-shaped cross section. In some cases, the elongate rail has a channel in the centre stem of the T-shaped cross section configured to assist cooling.

According to a second aspect of the invention, there is an adjustable bearing assembly comprising a first toothed bar and a second toothed bar. The first toothed bar comprising a first plurality of teeth aligned in a first direction and a bearing surface opposite the first plurality of teeth. The second toothed bar comprising a second plurality of teeth. The first plurality of teeth and the second plurality of teeth are in meshed engagement such that a force applied to the second toothed bar in the first direction causes the distance between the bearing surface and the second toothed bar to vary.

A third aspect of the present invention relates to a sliding member, for sliding on an elongate rail, the sliding member comprising a body member and two adjustable bearing assemblies mounted therein to engage opposing sides of the elongate rail, wherein the extent of protrusion of each of the adjustable bearing assemblies is adjustable. The sliding member may comprise a third adjustable bearing assembly mounted within the body member to engage a third side of the elongate rail. The adjustable bearing assemblies may each be adjustable bearing assemblies as described above.

Preferably, the above-described sliding member is suitable for use with ISO 12091-1 2011 compliant products.

BRIEF DESCRIPTION OF THE FIGURES

By way of example, a friction slide and its associated components according to the present invention will now be described with reference to the accompanying drawings, in which:

FIG. 1a is a perspective view of the sliding member and the elongate rail, viewed from below, in accordance with the present invention;

FIG. 4a is a sectional view of the sliding member of FIG. 4, taken through the line A-A shown in FIG. 4;

FIG. 8 is a sectional view of the first toothed bar, taken through the line Y-Y shown in FIG. 6a.

It will be appreciated that the embodiments shown in the figures are by way of example only, and that alterations or modifications may be made within the scope of the invention as defined in the appended claims.

DETAILED DESCRIPTION

The present invention relates to a friction slide 1 comprising a sliding member 100 that has bearing surfaces that can be adjusted to optimize sliding performance. For convenience and clarity, several directions are now defined to help concisely explain the invention. As seen in FIG. 1A, a longitudinal direction extends along the line LA which corresponds to the direction in which the sliding motion of the sliding member 100 occurs. A transverse direction is defined as any direction which is substantially perpendicular to the longitudinal LA direction. One exemplary transverse direction is indicated on FIG. 1A by line TA. Two transverse directions are illustrated on FIG. 2, the vertical direction that is indicated by the line labelled VER, and the lateral direction that is indicated by the line labelled LAT. However, friction slides can be used in any orientation, and thus these directional terms are intended to be descriptive of the device, when in the illustrated orientation, rather than limiting on the device in general.

Figure 1:
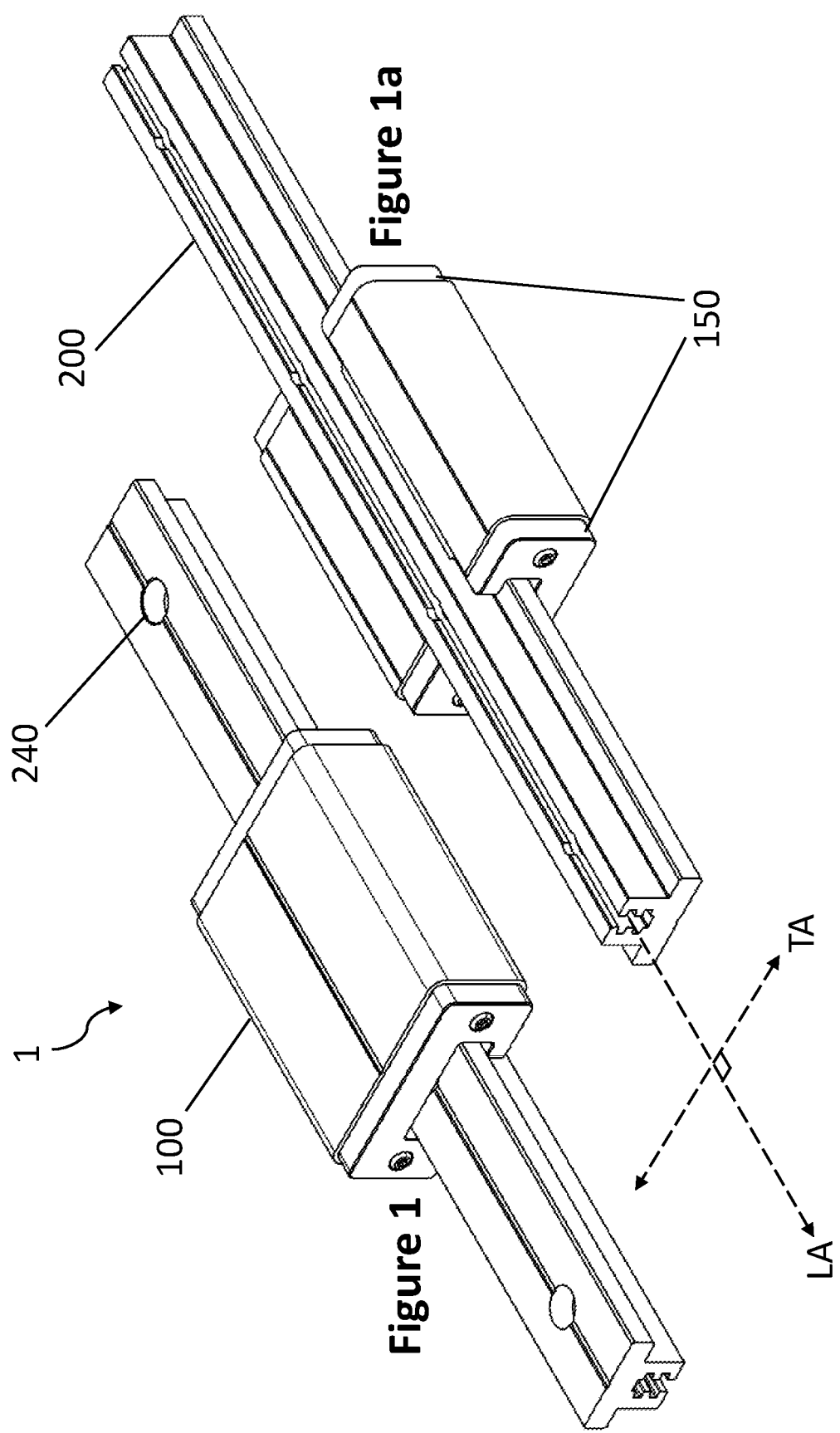
FIG. 1 is a perspective view of a sliding member and an elongate rail, viewed from above, in accordance with the present invention.
Figure 2:
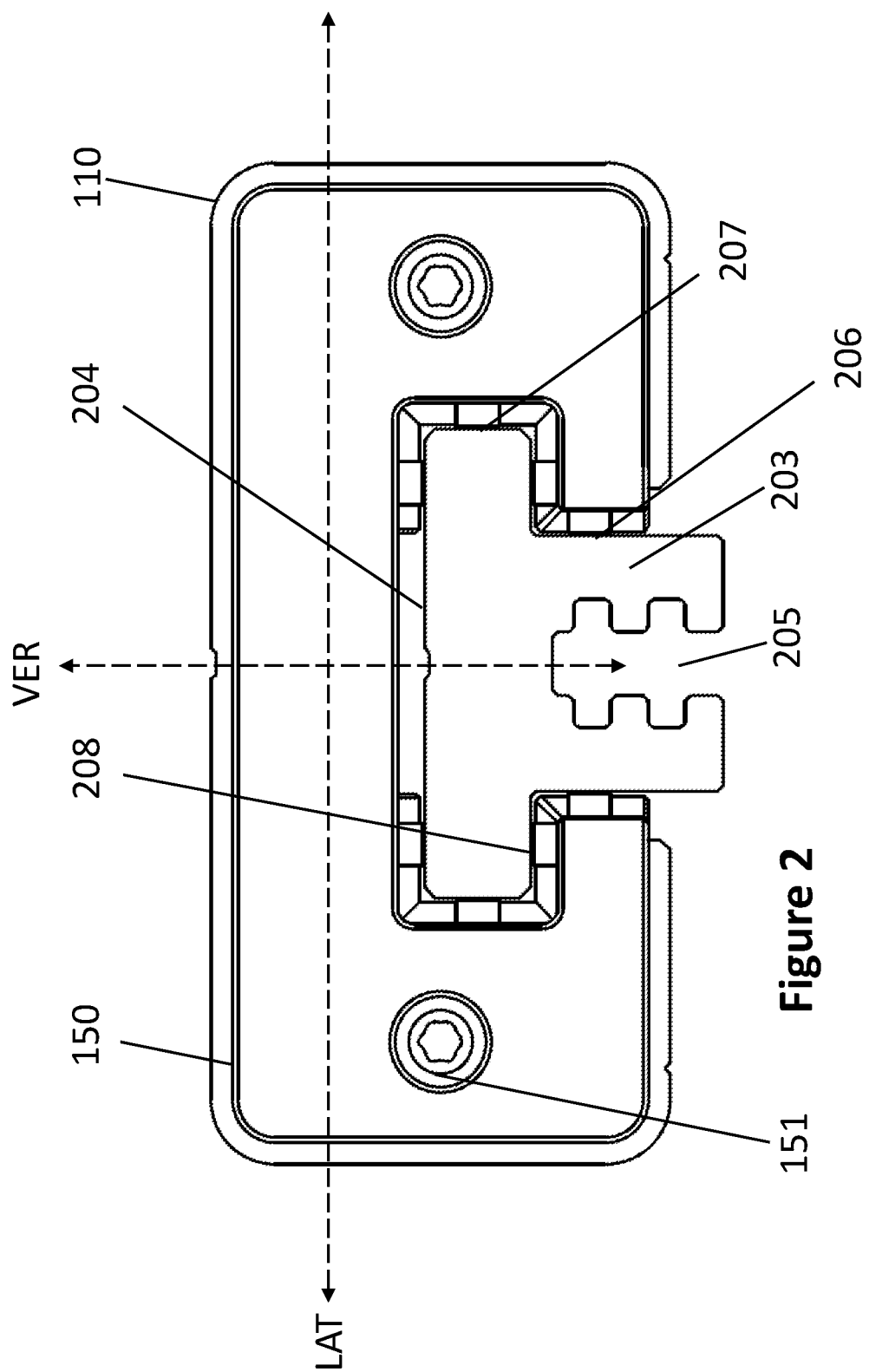
FIG. 2 is a front view of the sliding member and an elongate rail of FIG. 1.

A friction slide 1 in accordance with the present invention is shown in FIGS. 1 and 2. The friction slide 1 includes a sliding member 100 that can linearly translate on an elongate rail 200. The sliding member 100 slides on the elongate rail 200 in a longitudinal direction LA supported by multiple adjustable bearing assemblies.

Figure 3:
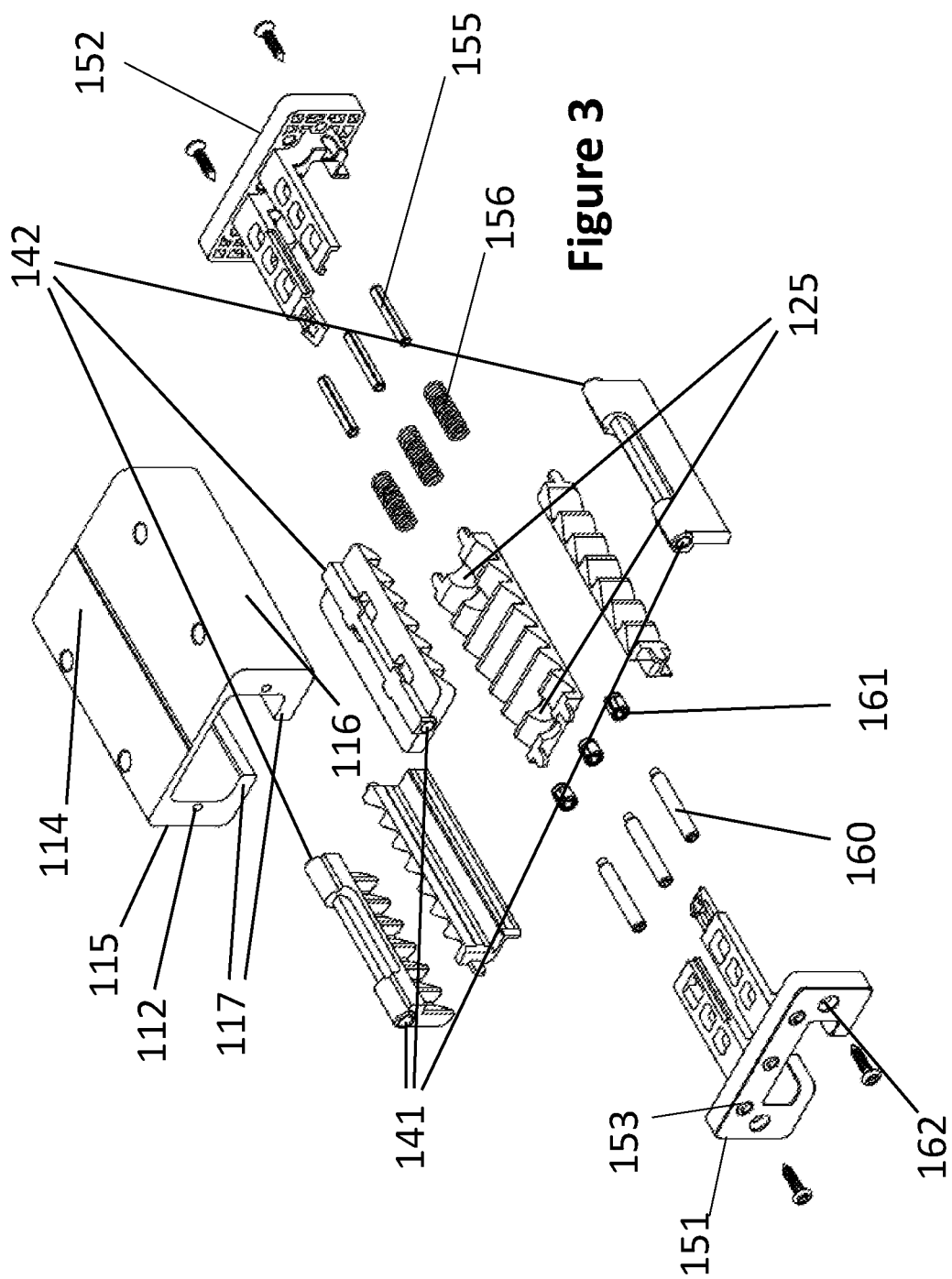
FIG. 3 is an exploded view showing the component parts of a sliding member according to a first embodiment of the present invention.
Figure 4:
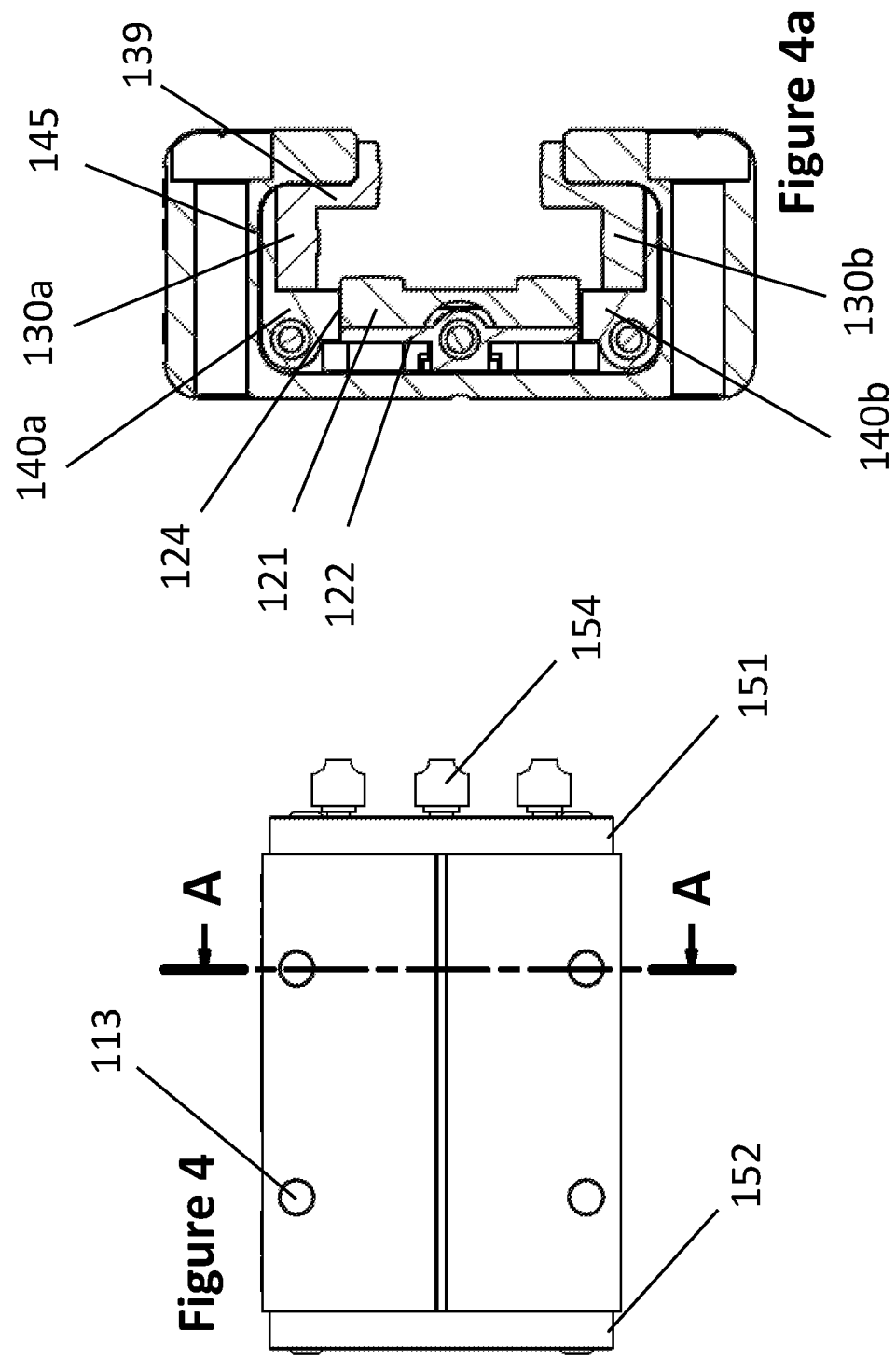
FIG. 4 is a top view of a sliding member according to a second embodiment of the present invention.

A sliding member 100 and its three adjustable bearing assemblies can be seen in FIGS. 3, 4, and 4a. Each adjustable bearing assembly comprises a first toothed bar 130a and a second toothed bar 140a. The first toothed bar 130a comprises an engagement surface comprising a first plurality of teeth 138 that are aligned in a first direction. In a similar manner, the second toothed bar 140a comprises an engagement surface comprising a second plurality of teeth 144 that are also aligned in the first direction. The first direction is substantially parallel to the longitudinal direction LA.

Figure 8:
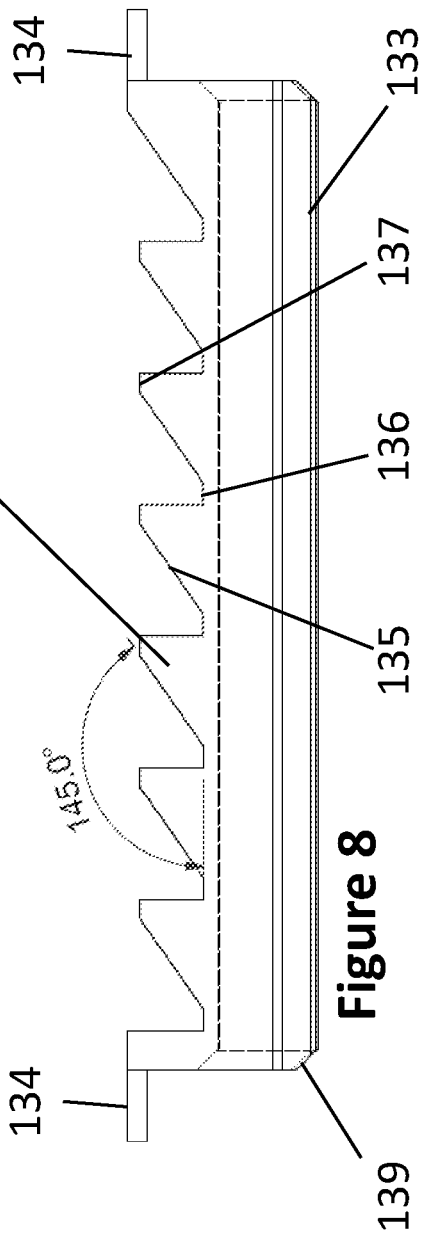

As best seen in FIGS. 4a and 8, the first toothed bar 130a has a first bearing surface 133 opposite the first plurality of teeth 138, whereas the second toothed bar 140a has a substantially flat mounting surface 145 opposite the second plurality of teeth 144. The first plurality of teeth 138 and the second plurality of teeth 144 are in meshed engagement such that movement of the first toothed bar 130a relative to the second toothed bar 140a in the longitudinal direction LA causes the distance between the first bearing surface 133 and the substantially flat mounting surface 145 to vary.

When the first toothed bar 130a is constrained from moving in the longitudinal direction LA a force that is applied to the second toothed bar 140a in the longitudinal direction will result in the first plurality of teeth 138 and the second plurality of teeth 144 sliding up against each other. Depending on the direction of the applied force, that is whether it is pushing or pulling the along the longitudinal direction, the force will either serve to allow the first toothed bar 130a and the second toothed bar 140a to move further apart in a transverse direction, or to allow the first toothed bar 130a and the second toothed bar 140a to move closer together in a transverse direction TA. Depending on the orientation and loading on the sliding support assembly the first toothed bar 130a and the second toothed bar 140a may not actually move when the longitudinal force is applied as the first toothed bar 130a and the second toothed bar 140a may not be engaged or may move out of engagement. The invention is most easily demonstrated in the situation whereby the first toothed bar 130a and the second toothed bar 140a remain in engagement. Therefore, herein, it is assumed that the present invention is orientated or loaded so that the first toothed bar 130a and the second toothed bar 140a remain in meshed engagement.

As the first plurality of teeth 138 and the second plurality of teeth 144 are in meshed engagement, moving the first toothed bar 130a and the second toothed bar 140a further apart in the transverse direction TA is equivalent to decreasing the overlap, or the degree of meshing, of the surfaces of the first plurality of teeth 138 and the surfaces of the second plurality of teeth 144. As a result, such transverse separation of the first toothed bar 130a and the second toothed bar 140a enlarges the outer dimension of the adjustable bearing assembly in the transverse direction TA "opening" the adjustable bearing assembly. There is a limit to the degree of opening which is defined by the profiles of the first plurality of teeth 138 and the second plurality of teeth 144. Once these profiles are transversely separated, to the extent meshed engagement does not occur, the adjustable bearing assembly will not open any further regardless of the longitudinal positions of the first toothed bar 130a and the second toothed bar 140a. When the adjustable bearing assembly is in this state it is known as the fully open position. Entering the fully open position may risk the first toothed bar 130a and the second toothed bar 140a moving into positions where they become locked or unable to return to their previous positions. Therefore, normally the sliding support is configured to stop opening before the fully open configuration is reached. A state approaching the fully open state is illustrated on the upper half of FIG. 7 and is marked MA.

When the first toothed bar 130a and the second toothed bar 140a are moved towards each other in the transverse direction TA it is equivalent to decreasing the distance between the first bearing surface 133 of the first toothed bar 130a and the mounting surface 145 of the second toothed bar 140a. This therefore reduces the outer dimension of the adjustable bearing assembly in the transverse direction TA and is known as "closing". There is a limit to the degree of closing which occurs when the profiles of the first plurality of teeth 138 and the second plurality of teeth 144 are fully engaged. When the adjustable bearing assembly is in this state it is known as the fully closed position, this state is illustrated on the lower half of FIG. 7 and is marked MB.

The first and second toothed bar 130a, 140a have an undulating surface wherein the undulations form a periodic series of similarly sized features which form teeth.

The first toothed bar 130a and the second toothed bar 140a therefore are pieces comprising a plurality of similarly sized and shaped protrusions, the protrusions being formed one after the other along the longitudinal direction. The protrusions are known as teeth. The pitch of the teeth is constant i.e. there is an equal spacing in-between any two neighbouring teeth. As seen on FIG. 8, each tooth comprises an inclined surface 135 rising from a base 136 and terminating at a top 137. The tops of all teeth in the first plurality of teeth 138 protrude up to a plane that is parallel with the longitudinal direction LA. Similarly, the tops of all teeth in the second plurality of teeth 144 protrude up to another plane that is substantially parallel with the longitudinal direction LA.

Figure 7:
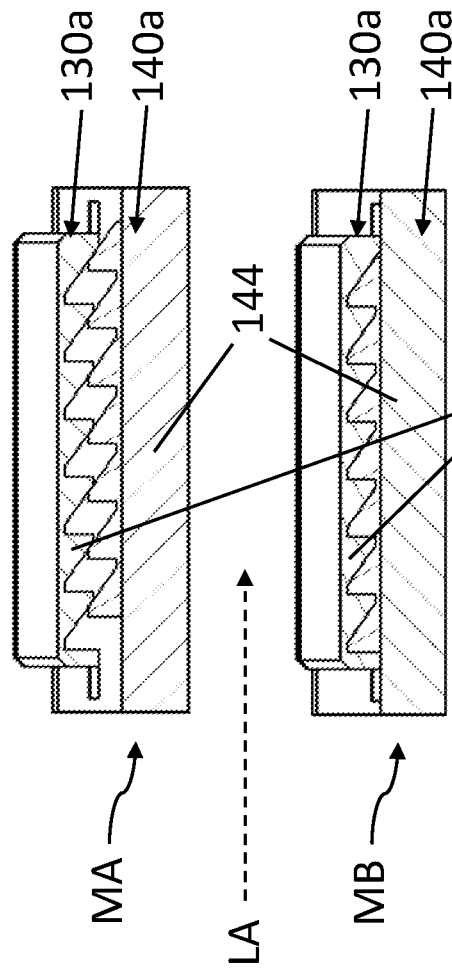
FIG. 7 illustrates the first toothed bar and second toothed bar of an adjustable bearing assembly in accordance with the present invention in the states when the adjustable bearing assembly is almost fully open (MA) and when the adjustable bearing assembly is fully closed (MB)

As best seen in FIG. 7, the second plurality of teeth 144 define a complementary profile that is similarly sized and shaped to a profile defined by the first plurality of teeth 144. As best shown in FIG. 8, in some embodiments, the first plurality of teeth define a truncated saw tooth profile. The second plurality of teeth define a corresponding second truncated saw tooth profile. Since the first plurality of teeth 138 and the second plurality of teeth 144 are in meshed sliding engagement, the inclined surfaces of the first plurality of teeth 138 are in sliding engagement with corresponding inclined surfaces of the second plurality of teeth 144. In the illustrated embodiments, these sliding surfaces define a series of flat parallel planes that are all inclined by the same angle to the longitudinal axis.

In other embodiments, the profile of the first plurality of teeth 138 may be different from the profile of the second plurality of teeth 144. Any meshing profiles can be used which engage on periodic similarly inclined surfaces such that longitudinal movement of the first profile relative to the second profile, as a result of an applied longitudinal force, will cause relative movement of the first toothed bar relative to the second toothed bar in a transverse direction TA. In particular, curved inclined surfaces are also possible as are surfaces with one or more curvatures.

Variations in the inclination of the meshed and engaged surfaces mean that the conversion of the applied longitudinal force to the force that causes transverse motion can be varied across the range of motion such that the mechanical advantage varies.

As seen in FIGS. 3, 4*a* and 8, the second plurality of teeth 144 in the second toothed bar 140*a* are recessed from the surface of the second toothed bar 124 which is opposed to the mounting surface 145. The depth of recessing means that the first toothed bar 130*a* and the second toothed bar 140*a* do not extend past the surface of the second toothed bar 124. In this way, the second toothed bar 140*a* is partially surrounded by the first toothed bar 130*a* which serves to minimize the overall size of the adjustable bearing assembly.

The first toothed bars 130*a* and second toothed bars 140*a* may be made of a low friction polymer, preferably a PTFE micro fibre filled Acetal. Other suitable materials would be known to those skilled in the art.

The angle of the inclined surfaces is optimised to provide effectiveness in converting the relative longitudinal motion of toothed bar into relative transverse motion of the toothed bar. Another important consideration is maintaining a thin transverse dimension of the adjustable bearing assembly. As best seen on FIG. 8, the inclined surface of the toothed bars are inclined from the longitudinal direction LA by an angle θ in the range 130 to 160 degrees, more preferably in the range 140 to 150 degrees, or an angle of 145 degrees. The inclined surfaces of the toothed bar are thus sufficiently steep that a small amount of movement in the longitudinal direction LA produces a large adjustment the transverse separation of the first and second toothed bar.

The relationship between the position of the second toothed bar in the transverse direction TA and the longitudinal position of the first toothed bar is given by:

$$Tp = Lp \tan(180-\theta)$$

where Lp is longitudinal position measured from the fully closed position, Tp is the transverse position measured from the full closed position, and θ is the angle of inclination of the inclined surface.

The toothed bars may be adapted to have rounded edges and radiused corners to make construction easier and to make the edges of components less liable to incur damage.

FIGS. 1 to 6*a* show sliding members 100 that comprise the above described adjustable bearing assemblies. The sliding member 100 comprises a body member 110, the body member 110 comprises a web 114, a first flange 115, and a second flange 116. The first flange 115 and second flange 116 are substantially parallel to each other and perpendicular to the web 114 forming a C-shaped channel section. The first flange 115 and the second flange 116 extend from the web 114 and are coterminous. The end of the first flange 115 has a first overhanging lip 117, and the end of the second flange 116 has a second overhanging lip 118. The first overhanging lip 117 and the second overhanging lip 118 are coplanar and extend towards each other, substantially parallel to the web 114. The first and second overhanging lips 117, 118 define a gap 111 that extends through the sliding member 100 in the longitudinal direction LA. An elongate rail 200 extends through the channel of the body member 110 in the longitudinal direction. The elongate rail 200 also comprises a stem which extends through the gap 111.

The sliding member 100 further comprises a first end cap 151 and second end cap 152 located at opposing longitudinal ends of the body member 110. The first end cap 151 and second end cap 152 seal the body member 110 in the longitudinal direction and hold various parts of the sliding member in place. The first end cap 151 and the second end cap 152 also help prevent foreign objects entering the sliding member 100. The first end cap 151 and the second end cap 152 have a thickened section 164 which protrudes into the body member 110. The thickened section 164 has a profile that corresponds to the inner profile of the body member 110 and therefore serves to both effectively seal the end caps to the body member 110 and help prevent the ingress of detritus. The end caps fit to the body member 110 to ensure that the end caps are aligned to each other and to the body member 110.

The end caps comprise a plurality of blind apertures 163 in the surface that faces the body member 110. The blind apertures 163 serve to reduce the weight without significantly reducing the mechanical integrity of the end caps. In addition, the end caps have a plurality of apertures 153 extending through them. The through apertures permit communication to the enclosure that is formed by the body member 110 and the end caps 151,152.

The first end cap 151 and the second end cap 152 are formed with attaching means. The attaching means retains the first end cap 151 and the second end cap 152 together when they are pressed together in the longitudinal direction. The attaching means has snap fit functionality which simplifies assembly of the sliding member 100. The attaching means comprises longitudinal projections 157. The longitudinal projections comprise a series of square apertures therein. For each end cap, the longitudinal projection 157 on the right hand side, when looking at the face of the end cap that faces away from the body member 110, has a snap feature 158 positioned at the end of the longitudinal projection 157 furthest from the end cap. The snap feature 158 comprises a ramped section followed by a step down to form two hooks. The end of the longitudinal projection with the snap feature 158 has reduced width and height to allow it to be resiliently deflectable. The longitudinal projection on the left hand side has a groove 165 designed to receive the snap feature 158 into an aperture 159.

Each end cap is further secured to the body member 110 by screws which extend through corresponding apertures 162 into corresponding threaded holes 112 formed in the faces on the longitudinal ends of the body member 110. In some embodiments, the screws retain the end caps in position without need for other attaching means. Alternatively, snap fit attaching means may be used without screws.

The received elongate rail 200 has a T-shaped cross section. It has a cross section such that a central stem 203 terminates at a loading track 204 positioned to be substantially orthogonal to and to bisect the plane of symmetry of the central stem piece 203. At the sides of the central stem are central tracks 206. The loading track 204 presents a substantially flat large face on the surface opposite the surface from which the central stem extends. There are side tracks 207 which are substantially orthogonal to, and on the side of, the loading track 204. The two lower tracks 208 provide overhanging surfaces on either side of the central stem 203.

The elongate rail 200 and sliding members 100 have one or more mounting apertures comprising the sliding member mounting apertures 113, and the elongate rail apertures 240. The mounting apertures enable the elongate rail 200 and sliding member 100 to be fixed to a first a second external object respectively, thereby enabling or facilitating sliding motion of the first external object to the second external object.

The elongate rail 200 and/or sliding member 100 may be made from aluminium, or steel, or other suitable materials that would be known to a person skilled in the art. In particular, the elongate rail 200 and/or the sliding member 100 may be formed from extruded aluminium or steel. Preferably a hard anodised aluminium elongate rail 200 is used to maximise the wear resistance. The elongate rail 200 comprises a channel 205 extending in the longitudinal direction LA which serves to reduce material content and thus weight, and also serves to provide a larger surface area to help dissipate and heat. The heat that needs to be dissipated is generally generated due to friction when the sliding member 100 is moved, especially when it is moved under a heavy load. To further assist in cooling, in some embodiments, the channel 205 can have a cross section that has multiples branches. One such arrangement, where a central slot is bisected by two branches at roughly orthogonal angles to the central slot, is shown in FIG. 2. The channel 205 cross section may have other cross-sectional shapes, such as a shape with tapering branches which may, for example, resemble a fir tree.

Figure 5:
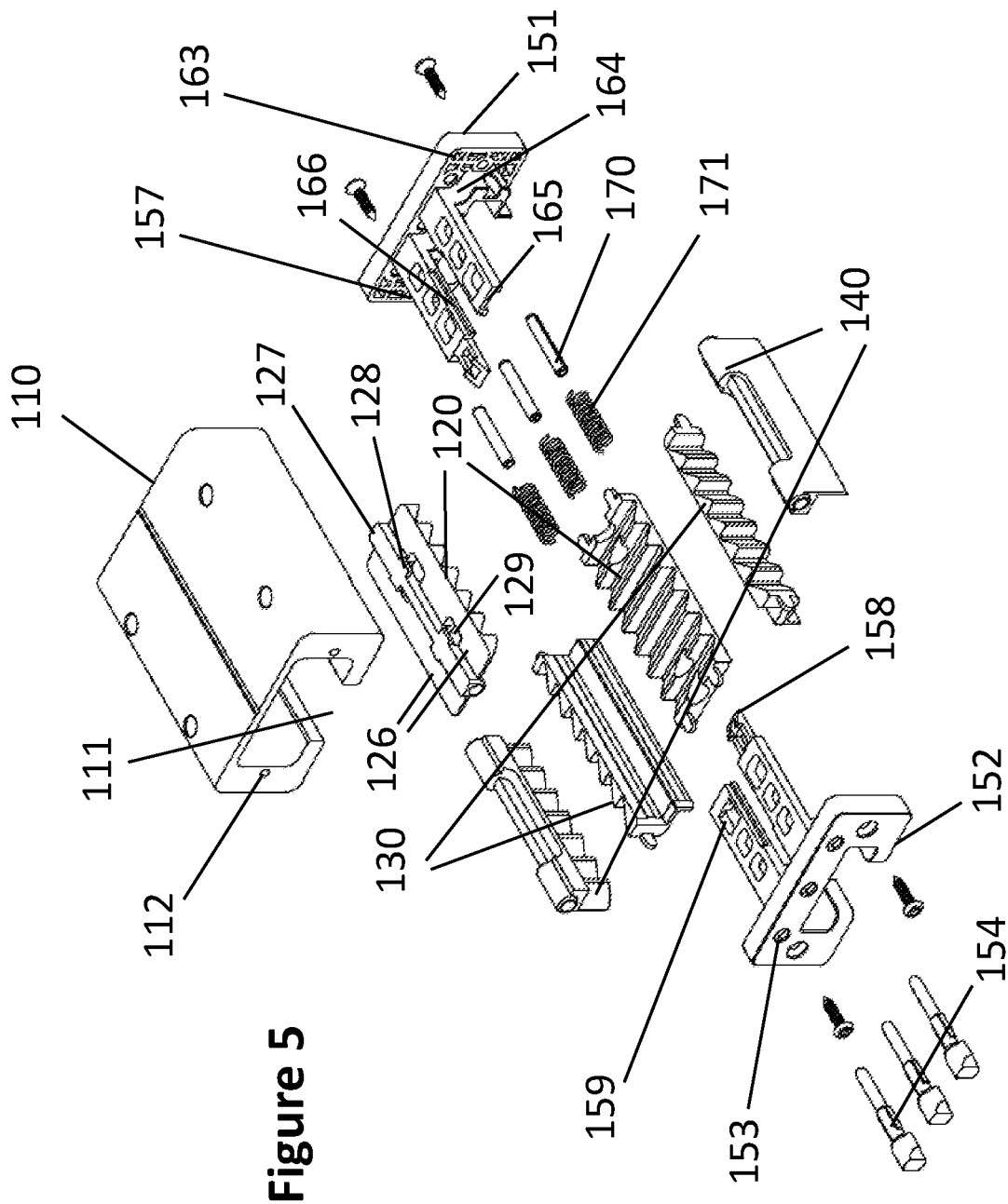
FIG. 5 is an exploded view showing the component parts of a sliding member according to a second embodiment of the present invention.
Figure 6A:
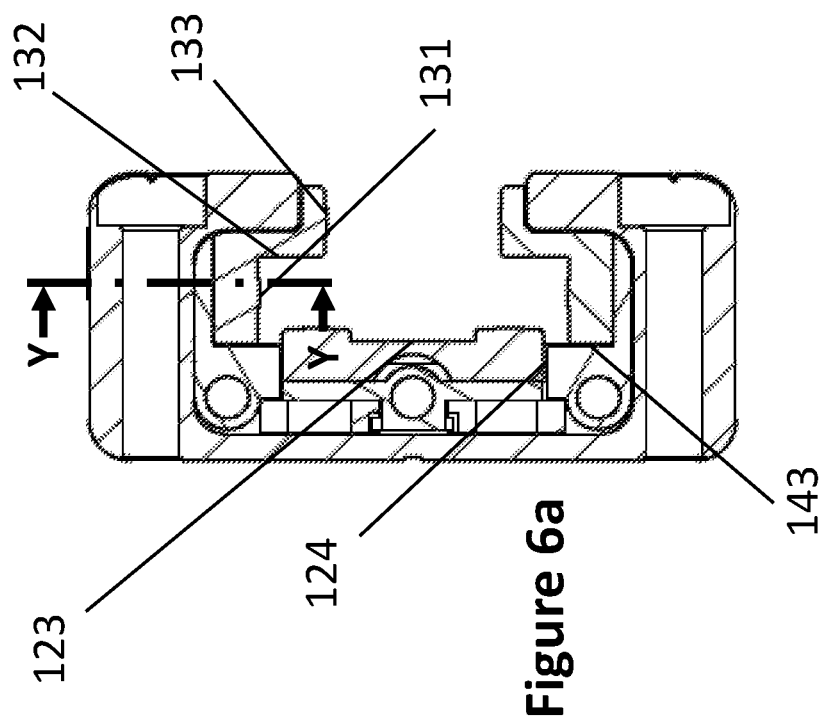
FIG. 6a is a sectional view of the sliding member of FIG. 6, taken through the line B-B shown in FIG. 4.
Figure 6:
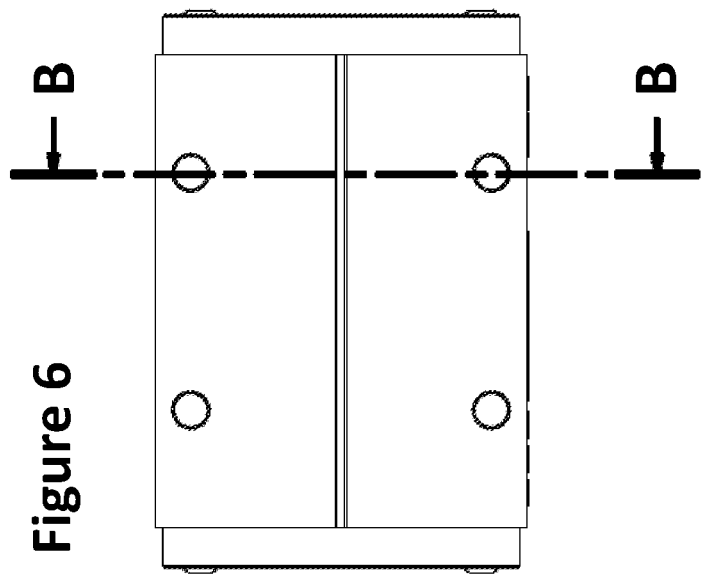
FIG. 6 is a top view of a sliding member according to a second embodiment of the present invention.

The elongate rail 200 has a series of surfaces comprising the loading track 204, central tracks 206, side tracks 207, and lower tracks 208 which are suitable for sliding engagement with the sliding member. The sliding member 100 fits over the elongate rail 200. The bearing surfaces of the adjustable bearing assemblies serve to act as a low friction sliding surface that engages the surfaces of the rails. As best seen by examining the adjustable bearing assemblies embodiment mounted on the first and second flanges in FIGS. 3, 4, and 4a; the bearing surface in the first toothed bar may have a step 139 in the bearing surface. This allows the bearing surface to better conform to the cross section of the elongate bar which spreads out the load and helps reduce wear of the sliding surfaces. In particular, the step 139 in the bearing surface allows the bearing surface to engage with multiple faces of the elongate bar. As shown in FIGS. 4a, 5, and 6a, the step 139 in the bearing surfaces provides three substantially flat bearing surfaces, the side 131, central 133 and lip 132 bearing surface. The lip bearing surface 132 is substantially perpendicular to both the side 131 and central 133 bearing surface, the side 131 and central 133 bearing surface is substantially parallel, and the central 133 bearing surface is positioned further from the first plurality of teeth 138 than the side bearing surface 131. The multiple bearing surfaces thus allows simultaneous supportive engagement of the central tracks 206, side tracks 207 and the loading track 204 of the T-shaped elongate rail 200.

In the embodiments shown in FIGS. 1 to 6a, there are two adjustable bearing assemblies 130a, 140a, 130b, 140b with stepped bearing surfaces that supportively engage opposite sides of the elongate rail 200. Having adjustable supports on opposing sides of the elongate rail 200 means that the sliding member can accommodate misalignment, particularly in the transverse direction TA. Furthermore, the large range of adjustment in the transverse direction TA that the presently described adjustable bearing assemblies provide both facilitates installation of the sliding member and ensures that the adjustable bearing assemblies have the capacity to mitigate any subsequent settling-in or wear. The two adjustable bearing assemblies comprise a first adjustable bearing assembly 130a, 140a and a second adjustable bearing assembly 130b, 140b. The first and second adjustable bearing assemblies are of similar design, the first adjustable bearing assembly being the mirror image of the second adjustable bearing assembly when the mirror plan is positioned on the side bearing surface of the second adjustable bearing assembly.

As is best seen in FIGS. 3, 5 and 6a, there is a further third adjustable bearing assembly 120 having a substantially flat bearing surface 123. As seen in FIG. 2, the third sliding assembly 120 supportively engages with the loading track 204. As may be seen, for example, in the cross sectional view in FIG. 4a, the bearing surface 123 has a width which extends across a substantial portion of the width of the web 114 and there is therefore a large area of contact between the bearing surface of the third sliding assemblies and the loading track 204. Preferably, the bearing surface 123 has a width of at least 50%, more preferably at least 70%, of the width of the web 114. The large area of contact helps to spread the load evenly over the bearing surface 123 which is particularly useful when the sliding member 100 is under heavy load, and avoids misalignment of the sliding member 100 which may occur when using multiple adjustable bearing assemblies.

The adjustable bearing assemblies are capable of performing a large range of transverse movement. Due to the steep inclined surfaces on the plurality of teeth of the toothed bars, this ability is provided without requiring a significant increase in the size of the sliding member 100 compared to non-adjusting sliding members.

As best seen in FIG. 3, the second toothed bar 122 of the third adjustable bearing assembly 120 has two grooves 126 in the surface opposite the second plurality of teeth. The two grooves are configured to receive the attaching means of the end caps. Specifically, the two grooves 126 are configured to receive and support the longitudinal projections 157. The two grooves form a central portion 127 in-between. From the top of this central portion on either side two protrusions, or tabs 128, extend a short distance overhanging their respective groove. The second toothed bar 122 of the third adjustable bearing assembly 120 has two apertures extending through the surface containing the second plurality of teeth in order to facilitate the forming of the tabs 128. The tabs 128 are received on rails 166 that are cut into the longitudinal projections of both end caps. In this way, the longitudinal projections serve to support the second toothed bar 122 of the third sliding support and hold it in place.

The first adjustable bearing assembly 130a, 140a is located on the first flange 115. The second adjustable bearing assembly 130b, 140b is located on the second flange 116. The third adjustable bearing assembly 120 is located on the web 114. As best seen in FIGS. 4a and 6a, the second toothed bar 140a of the first adjustable bearing assembly and the second toothed bar 140b of the second adjustable bearing assembly are positioned so that that are in contact with the first toothed bar 121 of the third adjustable bearing assembly 120. As the first support assembly and the second support assembly are on opposing flanges they serve to constrain the position of the first toothed bar 121 of the third adjustable bearing assembly 120 in the lateral direction LAT. The second toothed bar 140a of the first adjustable bearing assembly and the second toothed bar 140b of the second adjustable bearing assembly therefore provide support and assist with alignment of the first toothed bar 121 of the third adjustable bearing assembly. This avoids the need for additional supports and helps ensure that the third adjustable bearing assembly, which is likely to take the largest load, is itself adequately aligned and supported.

In order to constrain the longitudinal motion of each of the first toothed bars there are longitudinal tabs 134 that extend from either longitudinal end of the first toothed bars 130a, 130*b*, 121. As can be seen from FIG. 8, these tabs are positioned to extend up to a plane that that the tops 137 of the first plurality of teeth 128 line in. The tabs 134 engage the inner surfaces of the end caps, the inner surfaces being the surface that face the body section 110 of the sliding member 100. The tabs 134 are received into slots that are formed in the thickened section 164 of the end caps. The slots 165, along the body member 110, serve to limit the possible transverse movement of the adjustable bearing assemblies to one particular transverse direction.

Whilst the first toothed bars are limited to transverse motion they are not all limited to motion in the same direction. The first toothed bars 130*a*, 130*b* of the first and second support assemblies are limited to motion in the lateral direction LAT. Whereas, the first toothed bar 121 of the third support assembly 120 is limited to motion in the vertical direction VER.

The first, second, and third adjustable bearing assemblies support the elongate bar 200 in four directions. When FIGS. 2, 4*a* and 6*a* are considered, it is clear that the elongate bar is supported from:

"above" via the bearing surface 123 of the third adjustable bearing assembly on the loading track 204;

"below" via the lip bearing surface 132 of the first and second adjustable bearing assemblies on the corresponding lower tracks 208; and "left" and "right" via the side bearing surfaces 131 of the first and second adjustable bearing assemblies on the corresponding side tracks 207, and via the central bearing surface 133 of the first and second adjustable bearing assemblies on the corresponding central tracks 206. The sliding member is therefore constrained in such a way that the only direction in which the sliding member is not supportively engaged by the elongate rail is the sliding direction that is the longitudinal direction. The sliding member is therefore prevented from accidental separation from the elongate bar and, by adjustment of the adjustable bearing assemblies, may also be prevented from rattling.

A first embodiment of a sliding member 100 is shown in FIG. 3. In this embodiment, each adjustable bearing assembly comprises a closing adjuster that is configured to urge the adjustable bearing assembly to a partially or fully closed position. To do this, each closing adjuster applies a longitudinal force to change the longitudinal position of corresponding second toothed bar relative to the end caps 151, 152. As described above, the longitudinal position of the first toothed bars are fixed relative to the end caps 151,152, by the locating tabs 134. Therefore, the change in position serves to actuate the support assembly into the closed position.

The closing force is dependent on the longitudinal position of the second toothed bar, and is applied by a resilient element in contact with the second end cap 152. The resilient element is a spring 156, the spring 156 being selected to have characteristics that match the envisaged loads and range of travel. To ensure the spring 156 does not bow in use a rod 155 passes through the spring. Each rod 156 is received in receptacles 142 in the corresponding second toothed bar engaged by the rod and in the second end cap 152. When assembled, each spring 156 thus applies an opposing force to the second end cap 152 and the second toothed bar to which it is engaged. The closing adjuster operates automatically without requiring interaction with the user.

Each adjustable bearing assembly in FIG. 3 also comprises a manual opening adjuster 160 that is configured to apply a manual opening force in the direction that is in opposition to the closing force. Each manual opening adjuster 160 applies the force by pressing against an engaged second toothed bar whilst being supported by the first end cap 151. The manual opening adjuster 160 is in threaded engagement with and extends through the first end cap 151. As illustrated, the threaded engagement of the manual opening adjuster 160 is provided by threaded bush 161 which is pressed into aperture 153 of end cap 151 and held in the aperture 153 by friction. The threaded bush 161 comprises a longitudinal slot such that the bush 161 provides a pinching force on the manual opening adjuster 160 to reduce the likelihood of unwanted movement of the manual opening adjuster 160 during use. The portion of the manual opening adjusters 160 that extends through the end cap 151 and is not inside the body member 110 may terminate at a handle or grip which has been configured to allow direct adjustment by the user. This configuration may include shaping and texturing of pieces in order to make them more easily manipulated or rotated by a user. The manual opening adjusters 160 may alternatively or additionally comprise means for adjustment using tools; for example, the manual opening adjusters 160 may comprise screw heads or hexagonal sockets for adjustment using a screwdriver or a hex key. The manual opening adjusters 160 are configured to allow adjustment when the sliding member 100 is fully assembled and may be in situ on the elongate rail 200.

There are three manual opening adjusters coupled to the first, second and third adjustable bearing assemblies respectively. The three manual opening adjusters are positioned so that the handling parts (e.g., handles, grips, or means for adjustment using tools) are located in a straight line which makes it easier for a user to locate and manipulate the manual opening adjusters. This is especially useful when the sliding member is used in dirty environment or has limited access due to other nearby external components.

A second embodiment of a sliding member 100 is shown in FIG. 5. In this embodiment each adjustable bearing assembly comprises an automatic opening adjuster that is configured to automatically apply an opening force to the adjustable bearing assembly. The automatic opening adjuster operates without requiring any user interaction with the automatic opening adjuster. As in the manual opening adjuster, each automatic opening adjuster operates by pushing from the first end cap 151 to apply a force in the longitudinal direction LA to an engaged second toothed bar.

The automatic opening adjuster comprises a resilient element comprising a spring 171 and a rod 170. Each rod 170 is received in corresponding apertures in the first end cap 151. The rod 170 serves to align the spring 171 and prevent it bending, or bowing, when under load.

The sliding member 100 of FIG. 5 also comprises pins 154 which may be inserted to pull the first toothed bars and associated bearing surfaces away from the rail 200 to allow assembly. Once assembled, the pins 154 are removed and the bearing surfaces typically automatically come into contact with the rail 200 at a defined force determined by the springs 171.

In sliding members 100 according to both the first and second embodiments the third adjustable bearing assembly 120 has been configured to accommodate the part of the manual 160 or automatic 170,171 opening adjuster, that is received in the second toothed bar 122. In particular, the second toothed bar 122 comprises a channel or cut-out section which has been formed through several teeth of its toothed profile to accommodate the path of the opening adjuster. The first toothed bar 121 has been modified in a corresponding way.

The force applied by the automatic opening adjuster typically varies according to the longitudinal position of the second toothed bar 122 relative to the first end cap 151. The spring 171 may be selected to vary the opening force as required by any particular application. The opening force profile, that is the opening force applied plotted against longitudinal position of a second toothed bar to which the opening force is applied, may be described, within the limits of the longitudinal position of the second toothed bar as a linear function. However, in some embodiments, the profiles may be described by more complex function such as a polynomial or a function comprising several linear functions each applying in a different range of longitudinal position.

In some embodiments, the opening force profile for an automatic opening adjuster may be changed manually by manipulating the automatic opening adjuster through an aperture in the first end cap 151.

Both the automatic and manual opening adjusters can be configured to apply a preload to the adjustable bearing assembly. A preload is a load that is applied to the adjustable bearing assemblies in the absence of an additional external load. Preloading can optimize the sliding performance of the sliding member 100 on the elongate rail in several ways for example reducing rattle in a transverse direction or damping longitudinal sliding motion.

In the case of the first embodiment of the sliding member 100 it is also possible to manually adjust the clearance distance which may also improve sliding performance and reduce rattle. In addition, reducing the working clearance also has the effects of improving alignment and helping to help keep detritus from the bearing surfaces. Conversely, for curved elongate tracks or situations in which the sliding member 100 and track may be coupled to external elements which have limited degrees of freedom increasing the working clearance can improve the sliding performance of the sliding member 100.

For the case of the second embodiment of the sliding member 100, the automatic opening adjuster may allow a particular preloading force to be maintained regardless of the wear on the sliding surfaces. However, it may be possible to move the automatic opening adjuster to a desired working clearance as opposed to a desired preloading force.

When a particular preloading force is desired from an adjustable bearing assembly with an automatic opening adjuster, the particular preloading force can be selected by choosing a spring 171 of appropriate stiffness.

In use, the adjustable bearing assemblies of the second embodiment may be pushed towards the closed position by the force of the rail on the bearing surface, against the force of the springs 171. If the force on the bearing surface is lifted, the force provided by the springs 171 restores the adjustable bearing assembly towards the open position, typically maintaining contact between the bearing surface and the rail 200. This breathability is useful in some applications, such as when multiple sliding members are installed in parallel, since it can be difficult to get two slides perfectly aligned. The breathing function ensures that any misalignment is automatically accounted for. This means that if a sliding member 100 according to the first embodiment is coupled to a sliding member 100 according the second embodiment, such that both sliding members are operating in parallel, the breathing function can automatically account for misalignment.

The automatic adjustment of the adjustable bearing assemblies of the second embodiment provides a predictable sliding performance of the sliding member 100. This means that the force required to push the sliding member 100 may be the same regardless of wear. The selection of the geometry and force profile applied by the automatically opening adjusters allows the adjustable bearing assembly to automatically open and close (or to breathe) slightly during use, thereby maintaining contact and avoiding rattle.

When a load is applied to a sliding member, depending on the direction of loading, one of more adjustable bearing assemblies of the second embodiment may close since the force applied by the automatic opening adjuster is overcome by the load. In some situations, the loading may be sufficient to prevent sliding such that the sliding member only moves when the loading is at least partially reduced.

It will be appreciated that the described sliding member and sliding assembly could be used to support slidingly a wide variety of bodies and a wide variety of applications. They are particularly suitable for large loads in dirty environment. In order to promote cross compatibility the sliding member or adjustable bearing assemblies may be compliant with recognized standards in the field. For example, in some embodiments the sliding member fits ISO 12091-1 2011 compliant products.

However, the requirements of any particular application may lead to a variety of minor modifications or customizations being made. These modifications or customizations and their equivalents, may serve a wide variety of purposes, such as allowing mounting of components or reducing weight, and all would be clear to a skilled person.

In general fillets, chamfers, or other component finishing techniques are not described nor illustrated unless they assist in highlighting particular functional aspects of a component. However, all edges may have chamfers, fillets, or other finishes for a variety of reasons, such as to reduce possible damage when they contact other objects or for aesthetic reasons. The appropriate texturing and finishing necessary for these purposes are well-known to one skilled in the art.

The invention claimed is:

1. An adjustable bearing assembly comprising:
a first bar and a second bar; wherein
the first bar comprises a first engagement surface which is configured to engage with a second engagement surface on the second bar;
the first bar comprises a bearing surface opposite the first engagement surface; and
wherein the first engagement surface comprises a first plurality of teeth aligned in a first direction, wherein the first plurality of teeth are configured to be in meshed engagement with a second plurality of teeth on the second engagement surface such that a force applied to the second bar in the first direction causes the distance between the bearing surface and the second bar to vary, wherein the first plurality of teeth have a first truncated saw tooth profile, and wherein the second plurality of teeth have a second truncated saw tooth profile.

2. The adjustable bearing assembly of claim 1, wherein the force that is applied to the second bar results in a change in the position of the second bar along the first direction relative to the first bar.

3. The adjustable bearing assembly of claim 1, wherein the first direction is parallel with a plane defined by the bearing surface.

4. The adjustable bearing assembly of claim 1, wherein the bearing surface has grooves or ridges extending in the first direction, and wherein the bearing surface has filleted or radiused edges.

5. The adjustable bearing assembly of claim 1, wherein the second bar is recessed to receive and partially surround the first bar.

6. A sliding member comprising the adjustable bearing assembly of claim 1, wherein the sliding member comprises a body member having a first end cap and a second end cap located at opposing ends of the body member and wherein the first bar comprises a locating tab to engage the first end cap or the second end cap, such that the locating tab is received in a slot in one of the first end cap and the second end cap.

7. The sliding member of claim 6, wherein the adjustable bearing assembly comprises a closing adjuster configured to close the adjustable bearing assembly, wherein the closing adjuster is configured to apply a closing force to either the first bar or the second bar and wherein the closing force is dependent on the position of the second bar relative to the first bar.

8. The sliding member of claim 6, wherein the adjustable bearing assembly comprises a manual opening adjuster configured to open the adjustable bearing assembly, wherein the manual opening adjuster is configured to allow manual changing of at least one of the opening force and the position of the second bar relative to the first bar.

9. The sliding member of claim 8, wherein the manual opening adjuster is in threaded engagement with a first end cap and extends through the first end cap.

10. The sliding member of claim 6, wherein the adjustable bearing assembly comprises an automatic opening adjuster configured to automatically open the adjustable bearing assembly.

11. The sliding member of claim 10, wherein the automatic opening adjuster applies an automatic opening force to either the first bar or the second bar, wherein the automatic opening force is dependent on the position of the second bar relative to the first bar.

12. The sliding member of claim 10, wherein the automatic opening adjuster comprises an opening resilient element.

13. The sliding member of claim 10, wherein the automatic opening adjuster is configured to exert a different automatic opening force in response to a manual change of the automatic opening adjuster.

14. The sliding member of claim 6, wherein the body member comprises a web, a first flange and a second flange which together define a channel; wherein the adjustable bearing assembly is located within the channel and configured such that the bearing surface adjustably protrudes into the channel, and wherein:
- the adjustable bearing assembly is a first adjustable bearing assembly;
- the sliding member further comprises a second adjustable bearing assembly;
- the first adjustable bearing assembly is located on the first flange; and
- the second adjustable bearing assembly is located on the second flange,
- wherein the sliding member further comprises a third adjustable bearing assembly according to the adjustable bearing assembly of claim 1, and the third adjustable bearing assembly is located on the web.

15. The sliding member of claim 10, wherein the automatic opening adjuster comprises a spring.

16. A sliding member for sliding on an elongate rail, the sliding member comprising a body member and two adjustable bearing assemblies according to the adjustable bearing assembly of claim 1, mounted therein to engage opposing sides of the elongate rail,
- wherein the extent of protrusion of each adjustable bearing assembly is adjustable, and
- further comprising a third adjustable bearing assembly mounted within the body member to engage a third side of the elongate rail.

* * * * *